(12) United States Patent
Akeboshi et al.

(10) Patent No.: US 8,063,768 B2
(45) Date of Patent: Nov. 22, 2011

(54) MODEM APPARATUS

(75) Inventors: Yoshihiro Akeboshi, Tokyo (JP); Seiichi Saito, Tokyo (JP); Mitsuhiro Shimozawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1208 days.

(21) Appl. No.: 11/792,057

(22) PCT Filed: Apr. 14, 2005

(86) PCT No.: PCT/JP2005/007217
§ 371 (c)(1),
(2), (4) Date: Jun. 1, 2007

(87) PCT Pub. No.: WO2006/112016
PCT Pub. Date: Oct. 26, 2006

(65) Prior Publication Data
US 2008/0122587 A1    May 29, 2008

(51) Int. Cl.
*H04Q 1/30* (2006.01)
(52) U.S. Cl. ................. 340/538; 340/12.32; 340/288
(58) Field of Classification Search ............ 340/3.1, 340/538, 12.32, 288; 455/402
See application file for complete search history.

(56) References Cited

U.S. PATENT DOCUMENTS
4,745,391 A * 5/1988 Gajjar ..................... 307/104

FOREIGN PATENT DOCUMENTS

| JP | 58-12436 A | 1/1983 |
|---|---|---|
| JP | 360192426 | * 9/1985 |
| JP | 63-13428 A | 1/1988 |
| JP | 63-136726 | 6/1988 |
| JP | 2004-080436 | 3/2004 |
| JP | 2004-80441 A | 3/2004 |
| JP | 2004-248119 | 9/2004 |
| JP | 2005-5881 A | 1/2005 |
| JP | 2005-005922 | 1/2005 |
| JP | 2005-176038 A | 6/2005 |
| JP | 2005-311408 | 11/2005 |

* cited by examiner

*Primary Examiner* — Vernal Brown
(74) *Attorney, Agent, or Firm* — Birch, Stewart, Kolasch & Birch, LLP

(57) ABSTRACT

Provided is a modem apparatus of power line communication using a power line as a transmission path. The modem apparatus includes: an amplifier for amplifying communication signals and outputting a differential signal obtained from a pair of output signals having a phase difference of 180 degrees therebetween; a signal transformer for applying the amplified communication signals to the power lines; and a balance circuit connected at the primary side of the signal transformer, for enhancing circuit balancing. The balance circuit is constituted by a variable element capable of changing an element value, and there is provided a common mode detecting circuit that detects a common mode current flowing through the secondary side of the signal transformer and that changes the element value of the variable element of the balance circuit such that the detected common mode current becomes small.

8 Claims, 5 Drawing Sheets

PRIOR ART

PRIOR ART

MODEM APPARATUS

TECHNICAL FIELD

The present invention relates to a modem apparatus used in a power line communication system that uses existing power lines as transmission paths, capable of reducing a leakage electromagnetic field radiated from the power lines.

BACKGROUND ART

Power line communication (hereinafter, referred to as "PLC") that uses existing power lines as transmission paths, for performing communication has a problem of a leakage electromagnetic field radiated from the power lines during communication. A PLC signal is inputted in a differential mode to the power lines. However, there is a case where a common mode signal is generated by circuit unbalance in the power lines.

Common mode signals are transferred through two power lines in a common mode, and form current loops with the ground being feedback paths. It is possible that a leakage electromagnetic field radiated from a power line is proportional to the magnitude of a common mode current. Therefore, in order to reduce the leakage electromagnetic field, the common mode current flowing through the power line needs to be suppressed.

FIG. 4 is a diagram showing a circuit configuration of a general conventional modem apparatus. In FIG. 4, the conventional modem apparatus is provided with an amplifier 1, a signal transformer 3, and a common mode choke 2A. In the modem apparatus which outputs a PLC signal to power lines 4, a method of using the signal transformer 3 and the common mode choke 2A is generally adopted at an output end of the modem apparatus in order to suppress the common mode current. When the signal transformer 3 operates ideally, an unbalanced signal at a primary side is transformed into a balanced signal, and a common mode component does not flow.

FIG. 5 is a diagram showing a circuit configuration of another conventional modem apparatus (for example, see Patent Document 1). In FIG. 5, another conventional modem apparatus 10A is provided with a transmission circuit 1A that includes an amplifier, a common mode detecting circuit (balancing detector) 5A, and two balance circuits (balancing adjusting circuits) 2B. The configuration of FIG. 5 shows an example of suppressing the common mode current. Specifically, the balance circuits (balancing adjusting circuits) 2B are provided for power lines 4 serving as transmission paths, and the common mode detecting circuit (balancing detector) 5A controls the balance circuits 2B such that the levels of common mode signals become smaller.

Patent Document 1: JP 2004-80441 A

DISCLOSURE OF THE INVENTION

Problem to be Solved by the Invention

However, in the configuration of FIG. 4, an unbalanced component at the primary side of the signal transformer 3 propagates to the secondary side thereof because of capacitive coupling between the primary and secondary sides of the signal transformer 3, so the common mode current flows in practice through the secondary side. In particular, this unbalanced propagation from the primary side to the secondary side of the signal transformer 3 becomes larger for a high-frequency band signal, which causes a leakage electromagnetic field.

Since the transmission paths of the PLC system are the existing power lines, circuit balance of the transmission paths is generally poor, and it can be hardly said that the transmission paths are balanced paths. Further, there is a problem in that balancing of the power lines may be changed with time, so fixed circuit measures are not sufficient for constantly keeping high balancing.

In the configuration of FIG. 5, the balance circuits 2B are directly connected to the power lines 4. In this case, the power lines 4 have strong electrical coupling with the ground 6 via the balance circuits 2B, which may cause an increase in common mode current. In the same way, when the common mode detecting circuit 5A has electrical coupling with the ground 6, there is a problem in that an increase in common mode current is caused.

The present invention has been made to solve the above-mentioned problems, and therefore, it is an object of the present invention to provide a modem apparatus capable of suppressing the common mode current flowing through power lines and consequently of reducing a leakage electromagnetic field.

Means for Solving the Problems

According to the present invention, there is provided a modem apparatus used for power line communication which uses power lines as transmission paths including: an amplifier for amplifying communication signals and outputting a differential signal obtained from a pair of output signals having a phase difference of 180 degrees therebetween; a signal transformer for applying the amplified communication signals to the power lines; and a balance circuit connected to a primary side of the signal transformer, for enhancing circuit balancing.

Effects of the Invention

A modem apparatus according to the present invention can suppress a common mode current flowing through power lines and consequently reduce a leakage electromagnetic field.

BEST MODE FOR CARRYING OUT THE INVENTION

Hereinafter, a description is given of first and second embodiments of the present invention.

First Embodiment

Figure 1:
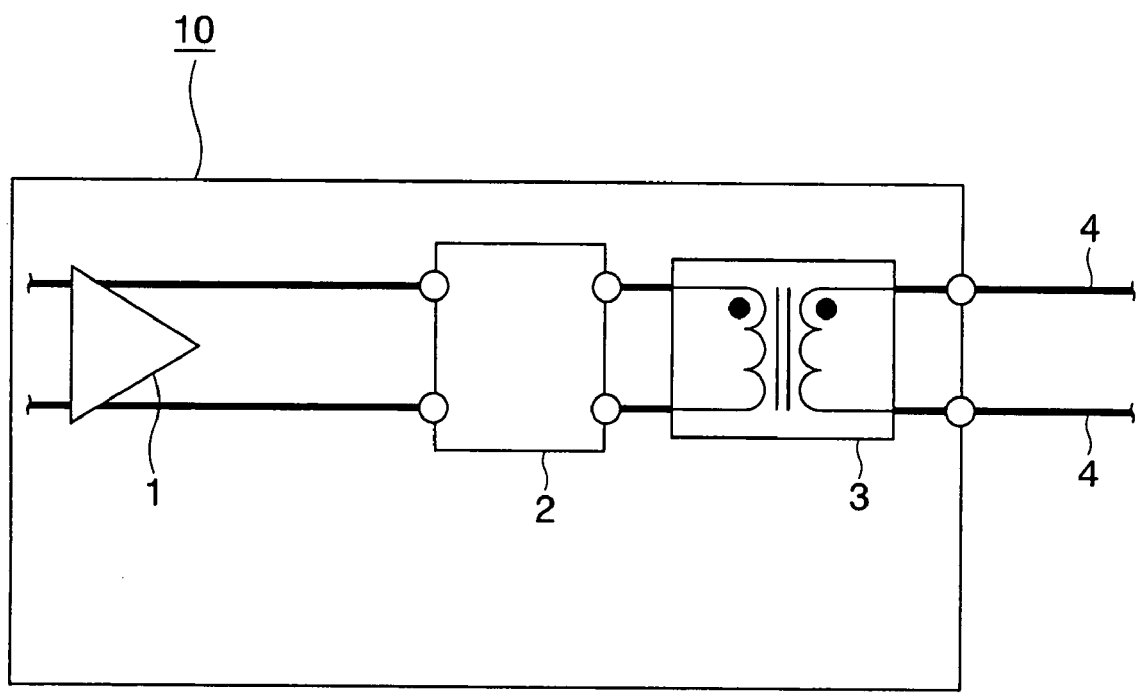
FIG. 1 is a diagram showing a configuration of a modem apparatus according to a first embodiment of the present invention.
Figure 2:
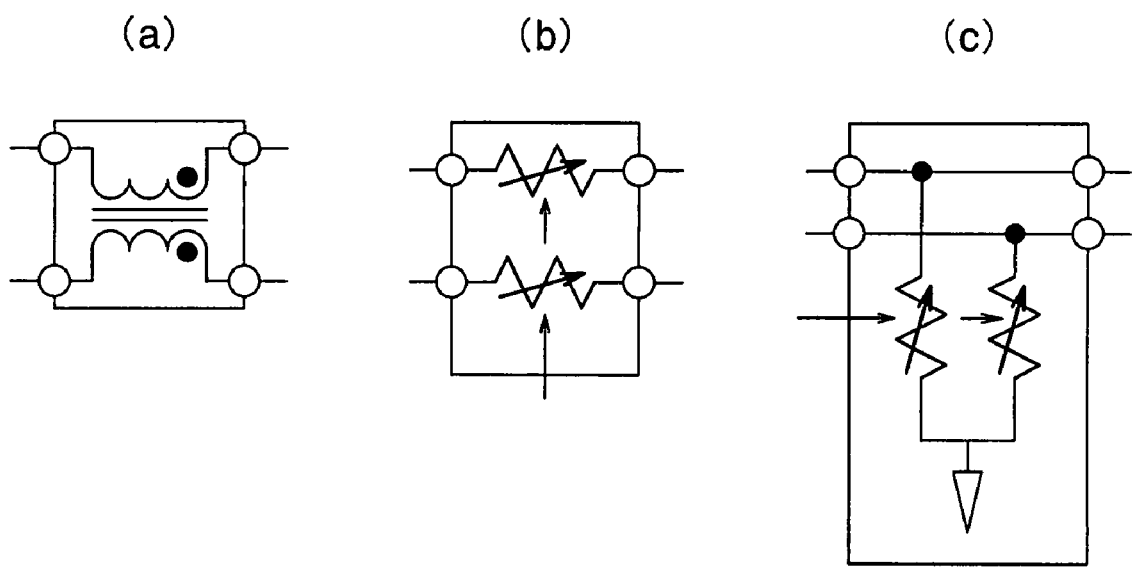
FIGS. 2(a) to 2(c) are diagrams showing concrete examples of a balance circuit of the modem apparatus according to the first embodiment of the present invention.

A modem apparatus according to a first embodiment of the present invention will be described with reference to FIGS. 1 and 2(a) to 2(c). FIG. 1 is a diagram showing a configuration of the modem apparatus according to the first embodiment of the present invention. FIGS. 2(a) to 2(c) are diagrams showing concrete examples of a balance circuit of the modem apparatus according to the first embodiment of the present invention. In the drawings, identical reference symbols indicate identical or corresponding parts, respectively.

In FIG. 1, the modem apparatus 10 according to the first embodiment includes an amplifier 1, a balance circuit 2, and a signal transformer 3. The amplifier 1, the balance circuit 2, and the signal transformer 3 are connected by board wirings. The signal transformer 3 is connected to power lines 4 by the board wirings.

The modem apparatus 10 includes the amplifier 1, which amplifies communication signals, the signal transformer 3, which applies the amplified signals to the power lines 4, and the balance circuit 2, which is connected for the purpose of enhancing circuit balancing. The amplifier 1 keeps the circuit balancing by outputting a differential signal obtained from a pair of output signals having a phase difference of 180 degrees therebetween. Further, the connection of the balance circuit 2 enhances the circuit balancing.

The balance circuit 2 is disposed at a primary side (amplifier 1 side) of the signal transformer 3. Since the power lines 4 are connected to a secondary side of the signal transformer 3, circuit balancing at the secondary side is not high in general. In this case, if electrical coupling with the ground exists at the secondary side of the signal transformer 3, the impedance to the ground for a common mode signal is reduced to cause a higher common mode current to flow, resulting in an increase in leakage electromagnetic field. With a configuration in which the balance circuit 2 is not connected to the ground, the balance circuit 2 may be disposed at the secondary side of the signal transformer 3. However, with a configuration in which an element configuration of the balance circuit 2 can be varied for the reason described later, the balance circuit 2 requires a control circuit and needs to be connected to the ground. Therefore, it is preferable to dispose the balance circuit 2 at the primary side of the signal transformer 1.

FIGS. 2(a) to 2(c) show concrete configuration examples of the balance circuit 2. FIG. 2(a) shows an example in which the balance circuit 2 is configured by a common mode choke element. The impedance is increased only for a common mode signal, so the radiation of the leakage electromagnetic field can be reduced.

FIG. 2(b) shows an example in which resistors are connected in series with board wirings. Those resistors may be configured by variable resistors such that the element values can be changed corresponding to the states of the power lines 4.

FIG. 2(c) shows an example in which resistors are connected between the ground and board wirings. Similarly, the resistors may be configured by variable resistors.

With a configuration in which the element values of the balance circuit 2 are variable, the element values can be changed so as to reduce the common mode current generated corresponding to unbalancing of the power lines 4. The element values can be changed online while performing communication or changed off-line at the time of modem setting.

Specifically, the modem apparatus 10 according to the first embodiment, which is used for power line communication using the power lines 4 as the transmission paths, includes the amplifier 1, which amplifies communication signals, the signal transformer 3, which applies the amplified communication signals to the power lines 4, and the balance circuit 2. The amplifier 1 keeps circuit balancing by outputting a differential signal obtained from a pair of output signals having a phase difference of 180 degrees therebetween. The balance circuit 2 is disposed at the amplifier 1 side (primary side) of the signal transformer 3 and connected to the differential signal, to thereby enhance circuit balancing. Further, the balance circuit 2 constantly keeps high circuit balancing by changing the element values corresponding to the states of the power lines 4.

Since the amplifier 1 outputs a differential signal obtained from a pair of output signals having a phase difference of 180 degrees therebetween, circuit balancing of the modem is enhanced. Further, since the balance circuit 2 is disposed at the primary side of the signal transformer 3 to enhance circuit balancing, it is possible to suppress the common mode current generated by unbalanced outputs of the amplifier 1 and an unbalanced analog circuit configuration. Since the balance circuit 2 is disposed at the primary side of the signal transformer 3, circuit balancing can be enhanced without causing electrical coupling between the power lines 4 and the ground. Accordingly, since the common mode current is suppressed at the primary side of the signal transformer 3, it is possible to suppress propagation of common mode signals to the secondary side (power lines 4 side) of the signal transformer 3 even with a coupling capacitance between the primary and secondary sides of the signal transformer 3, thereby achieving a reduction in leakage electromagnetic field. Further, the balance circuit 2 is configured such that the element value of each element can be changed. As a result, the element value of the balance circuit 2 can be changed corresponding to the changing states of the power lines 4, thereby making it possible to constantly suppress the common mode current.

Second Embodiment

Figure 3:
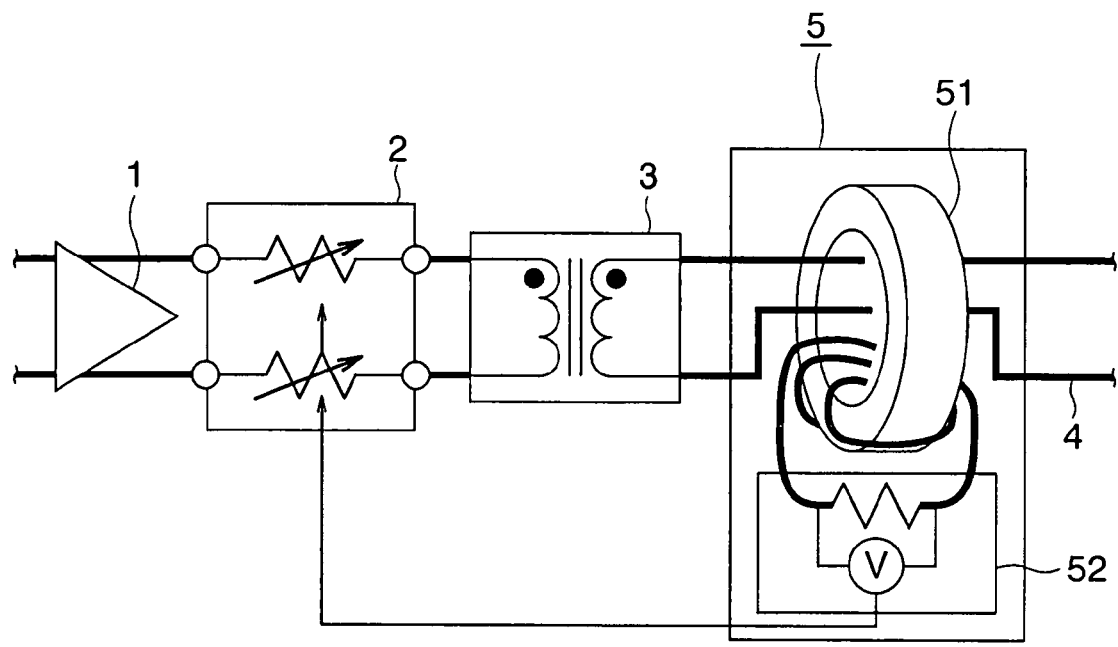
FIG. 3 is a diagram showing a configuration of a modem apparatus according to a second embodiment of the present invention.
Figure 4:
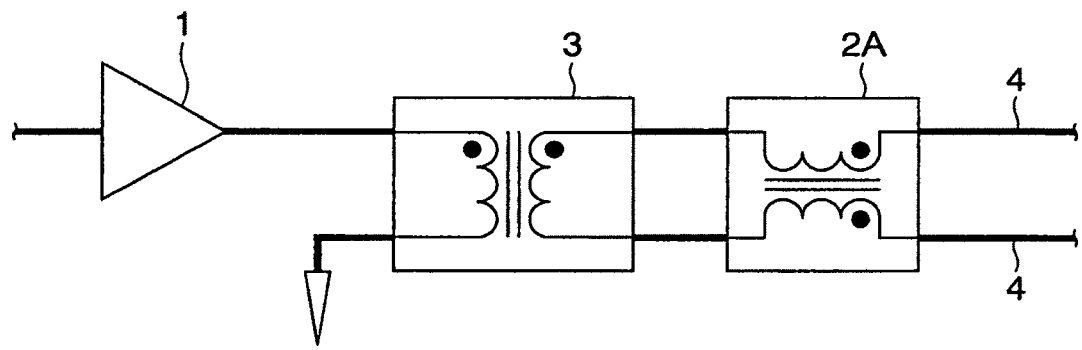
FIG. 4 is a diagram showing a configuration of a conventional modem apparatus.
Figure 5:
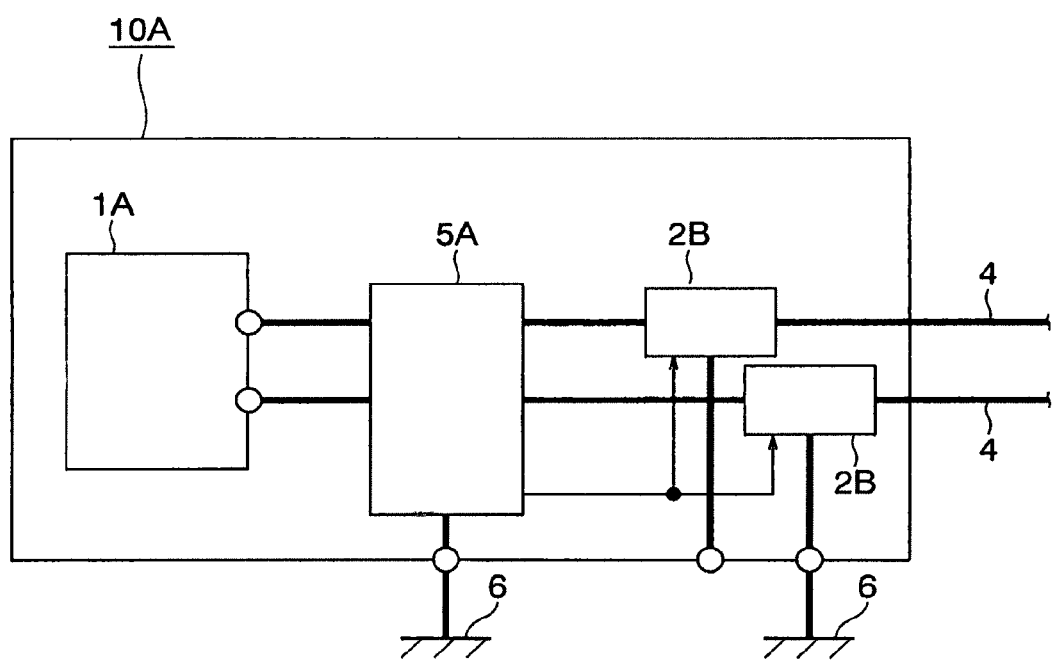
FIG. 5 is a diagram showing a configuration of another conventional modem apparatus.

A modem apparatus according to a second embodiment of the present invention will be described with reference to FIG. 3. FIG. 3 is a diagram showing a configuration of the modem apparatus according to the second embodiment of the present invention.

In FIG. 3, the modem apparatus according to the second embodiment includes the amplifier 1, the balance circuit 2, the signal transformer 3, and a common mode detecting circuit 5. The amplifier 1, the balance circuit 2, the signal transformer 3, and the common mode detecting circuit 5 are connected to each other by board wirings. The common mode detecting circuit 5 is connected to the power lines 4 by board wirings.

As shown in FIG. 3, the balance circuit 2 is provided at the primary side (amplifier 1 side) of the signal transformer 3. The element value of each element included in the balance circuit 2 is variable. The common mode detecting circuit 5 is provided at the secondary side (power lines 4 side) of the signal transformer 3. The common mode detecting circuit 5 has a function of measuring the magnitude of the common mode current flowing through the power lines 4. The common mode detecting circuit 5 also has an interface used to change the element value of the balance circuit 2 according to the magnitude of the detected common mode current.

The common mode detecting circuit 5 has a core 51. When the common mode current flows through the power lines 4, a magnetic field is produced along the core 51. This magnetic field causes an electromotive force to a winding of the core 51, the winding being connected to a level detecting section 52. Thus, a voltage corresponding to the magnitude of the common mode current can be detected.

The core 51 produces only magnetic coupling with the power lines 4, and is separated from the power lines 4 in the circuit. With this configuration, coupling between the power lines 4 and the ground is not produced, and therefore the common mode current is not increased.

The balance circuit 2 is configured by, for example, variable resistors connected in series with a pair of signal lines and is configured such that the resistance values can be changed under the control of the level detecting section 52. With this configuration, common mode current can be suppressed by appropriately changing the element values of the balance circuit 2 while monitoring the common mode current flowing through the power lines 4. Therefore, even when the states of the power lines 4 are changed, the radiation of a leakage electromagnetic field can be constantly reduced.

In other words, the modem apparatus according to the second embodiment further includes the common mode detecting circuit 5 for measuring the magnitude of a common mode current. The common mode detecting circuit 5 detects a common mode current flowing through the secondary side (power lines 4 side) of the signal transformer 3 and also changes the element values (resistance values) of the balance circuit 2 so as to reduce the common mode current.

Therefore, even when the states of the power lines 4 are changed, a leakage electromagnetic field can be constantly reduced. Further, since the common mode detecting circuit 5 and the balance circuit 2 are configured such that coupling between the power lines 4 and the ground is not produced, the common mode current is not increased.

The invention claimed is:

1. A modem apparatus used for power line communication which uses power lines as transmission paths, comprising:

an amplifier for amplifying communication signals and outputting a differential signal obtained from a pair of output signals having a phase difference of 180 degrees therebetween;

a signal transformer for applying the amplified communication signals to the power lines; and a balance circuit connected to a primary side of the signal transformer, for enhancing circuit balancing.

2. A modem apparatus according to claim 1, wherein the balance circuit is configured by a common mode choke element.

3. A modem apparatus according to claim 1, wherein the balance circuit is configured by a variable element capable of changing an element value.

4. A modem apparatus according to claim 3, wherein the variable element comprises a variable resistor connected in series with a board wiring.

5. A modem apparatus according to claim 3, wherein the variable element comprises a variable resistor connected between a ground and a board wiring.

6. A modem apparatus according to claim 3, further comprising a common mode detecting circuit connected to a secondary side of the signal transformer, wherein the common mode detecting circuit detects common mode current flowing through the secondary side of the signal transformer and changes an element value of the variable element of the balance circuit to reduce the detected common mode current.

7. The apparatus according to claim 3, where the element value changes based on the differential signal.

8. The apparatus of claim 6, where the common mode detecting circuit detects common mode current based on the differential signal.

* * * * *